United States Patent [19]

Dienes

[11] Patent Number: 4,511,415
[45] Date of Patent: Apr. 16, 1985

[54] METHOD OF SEALING AN ELECTRICAL CABLE

[75] Inventor: Zoltan B. Dienes, Annandale, N.J.

[73] Assignee: Thomas & Betts Corporation, Raritan, N.J.

[21] Appl. No.: 470,835

[22] Filed: Feb. 28, 1983

[51] Int. Cl.³ .......................................... H01B 13/10
[52] U.S. Cl. ................................. 156/48; 156/49; 156/54; 174/92
[58] Field of Search ................... 156/48, 49, 54; 174/84 R, 92, 21 R, 110 R, 120 SR; 285/284, 292, 293

[56] References Cited

U.S. PATENT DOCUMENTS

| 3,188,121 | 6/1965 | Cude et al. | 285/197 |
| 3,297,819 | 1/1967 | Wetmore | 174/127 |
| 3,361,605 | 1/1968 | Gilbert | 156/48 |
| 3,455,336 | 7/1969 | Ellis | 138/156 |
| 3,619,481 | 11/1971 | Smith | 174/138 |
| 3,823,250 | 7/1974 | DeMonsy et al. | 156/48 X |
| 3,951,712 | 4/1976 | Nakata | 156/48 |
| 4,025,717 | 5/1977 | Whittingham | 174/88 |
| 4,236,949 | 12/1980 | Horsma et al. | 156/49 |

OTHER PUBLICATIONS

Raychem XAGA 1600, Buried Splice Closure System.

Primary Examiner—Robert Dawson
Attorney, Agent, or Firm—Robert M. Rodrick; Salvatore J. Abbruzzese

[57] ABSTRACT

A method of sealing an exposed area of electrical cable includes forming an enclosure around the exposed area and interposing inlet means into an opening in the enclosure. An encapsulant is poured into the enclosure through the inlet means to surround the exposed area. The enclosure and the inlet means are then sealably covered.

13 Claims, 11 Drawing Figures

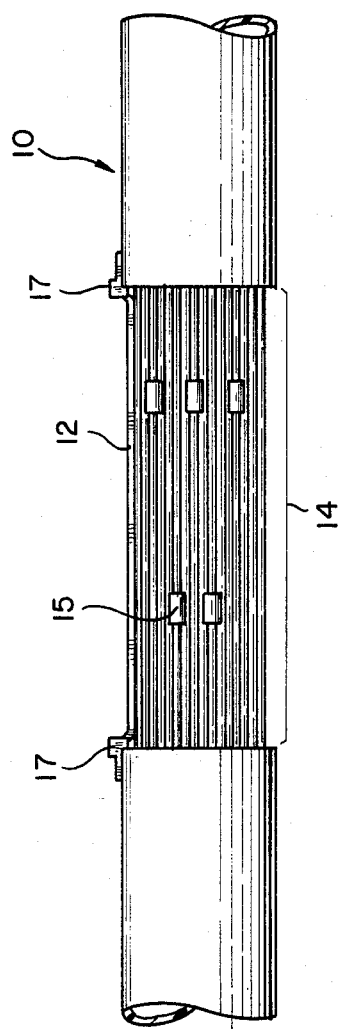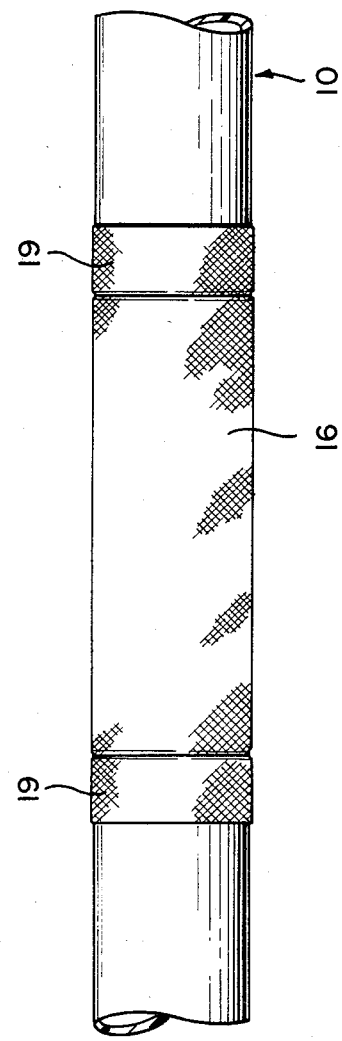

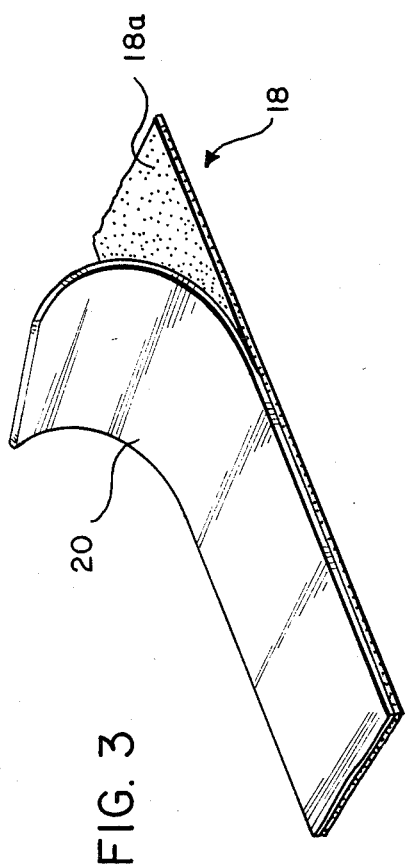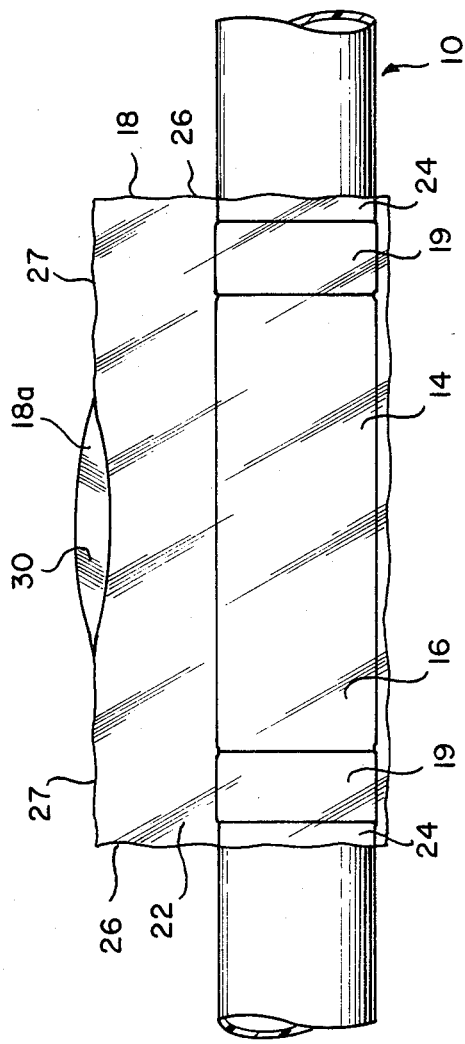

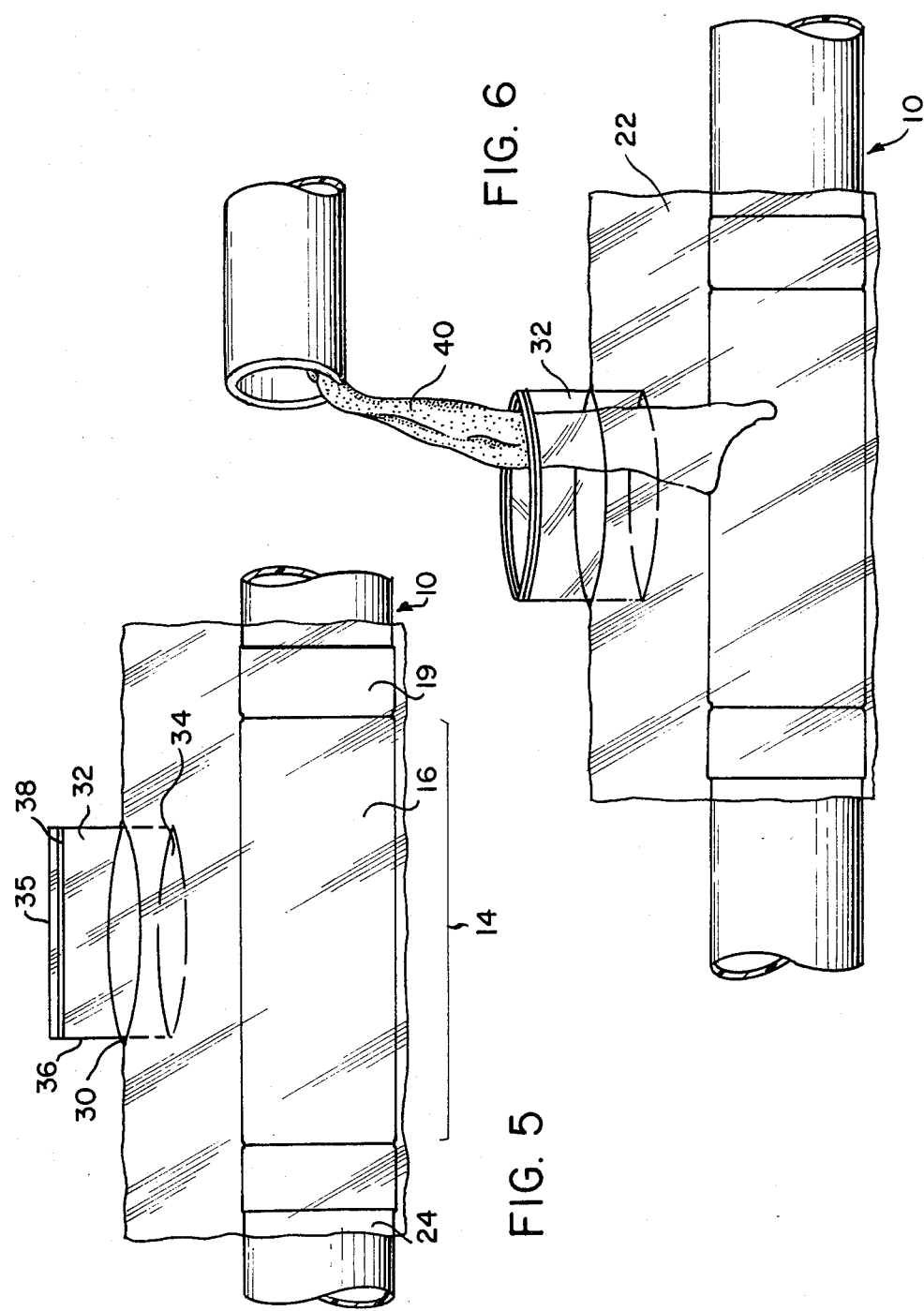

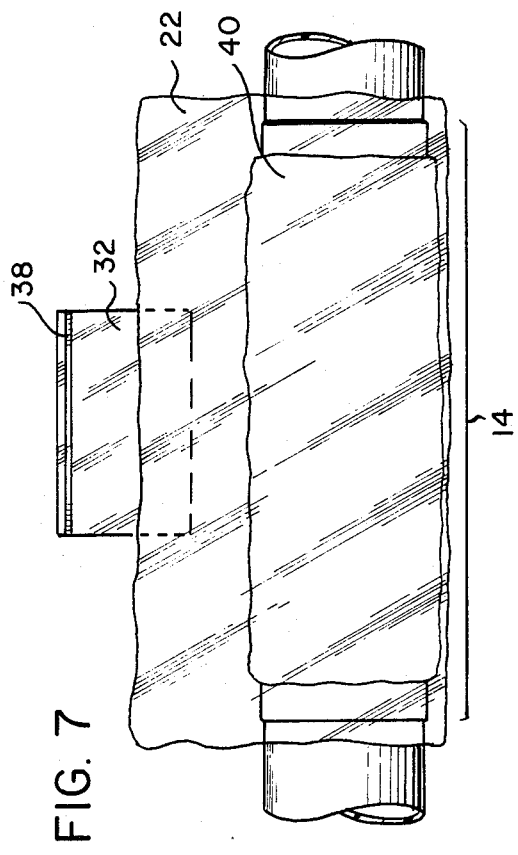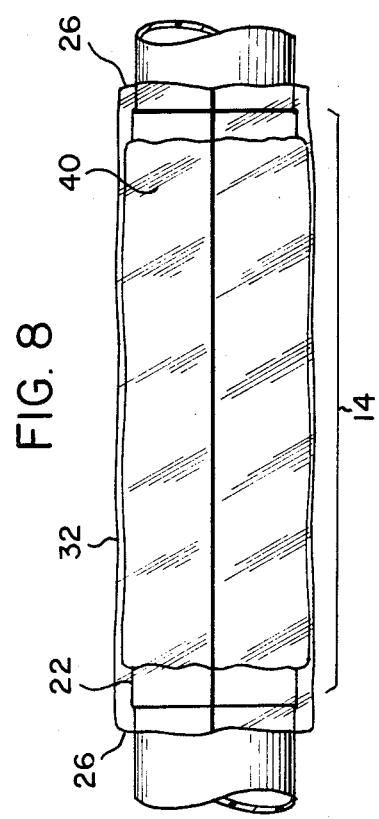

METHOD OF SEALING AN ELECTRICAL CABLE

FIELD OF THE INVENTION

This invention relates to a method of enclosing an exposed portion of an electrical cable and more particularly relates to a method of sealing a cable splice.

BACKGROUND OF THE INVENTION

In telecommunication systems, cables are normally employed in transmitting signals which include many small diameter insulated wires. These cables are often buried underground and therefore must be sealed against moisture and other environmental hazards. Typically, due to line failure or routine maintenance, one or more cables must be joined or spliced together. This necessitates violating the integrity of the cable to make such repair or splice. After entering the cable, the exposed area of the cable, commonly referred to as a cable splice, must be resealed before burial.

Currently, there are a variety of insulating covers and enclosures for sealing an exposed area of an electrical cable. Many of these closures include an encapsulant which surrounds the exposed area to seal against moisture penetration. These encapsulants are typically prepared in a semi-fluid state and poured over the exposed area. The encapsulant then cures to a gel-like consistency and effectively seals the exposed area of the cable. Since the encapsulant is initially used in a semi-fluid state and poured around the exposed area, an enclosure is typically used to retain the encapsulant prior to curing.

There are known splice closure systems which employ encapsulants and enclosures therefor. One such system, known as the XAGA 1600 Buried Distribution Splice Closure system manufactured by Raychem Corporation, employs a liner which is placed around the exposed area, of the cable. The liner is restricted at its ends with cable ties and held by the installer in an open position. A polyurethane encapsulant is poured into the opening of the liner and around the cable. While providing an adequate seal around the exposed area, this system is difficult to install in the field as it requires multiple parts such as cable ties, variable outer liners among others, to effectively contain the encapsulant. Further, the liner is difficult to manipulate as the opening therein is not fixedly positioned. In addition, the liner and other accessories needed for this installation are commonly provided in fixed lengths, thus limiting the range of cable splices which may be repaired.

It is therefor desirable to provide a cable splice repair system which is easily field installable and can accommodate a variety of splice lengths.

SUMMARY OF THE INVENTION

It is an object of the present invention to provide an improved method for sealing an exposed portion of electrical cable.

It is a more particular object to provide a method of sealing a cable splice including an encapsulant seal therearound.

In accordance with the present invention, an enclosure is formed around the exposed area of an electrical cable and is sealably attached thereto. An access opening is provided in the enclosure. A selectively closeable inlet means is interposed in the access opening for receipt of the encapsulant. The inlet means is then closed, preventing escape of the encapsulant and the enclosure and inlet means are sealably covered.

BRIEF DESCRIPTION OF THE DRAWINGS

FIG. 1 is a side elevational view of a portion of an electrical cable having an exposed central area which reveals the exposed conductors extending therethrough and electrical connections made therein.

FIG. 2 is a view of the cable of FIG. 1 showing an initial protective layer over the exposed conductors.

FIG. 3 shows the enclosure sheet used in the method of the present invention with a portion of the release layer peeled back.

FIG. 4 is a view of the cable of FIGS. 1 and 2 including the enclosure sheet of FIG. 3 placed thereon in accordance with the present invention.

FIGS. 5–10 show the cable of FIGS. 1 and 2 and the successive steps of sealing the exposed area in accordance with the preferred method of the present invention.

DETAILED DESCRIPTION OF THE PREFERRED EMBODIMENT

Figure 9:
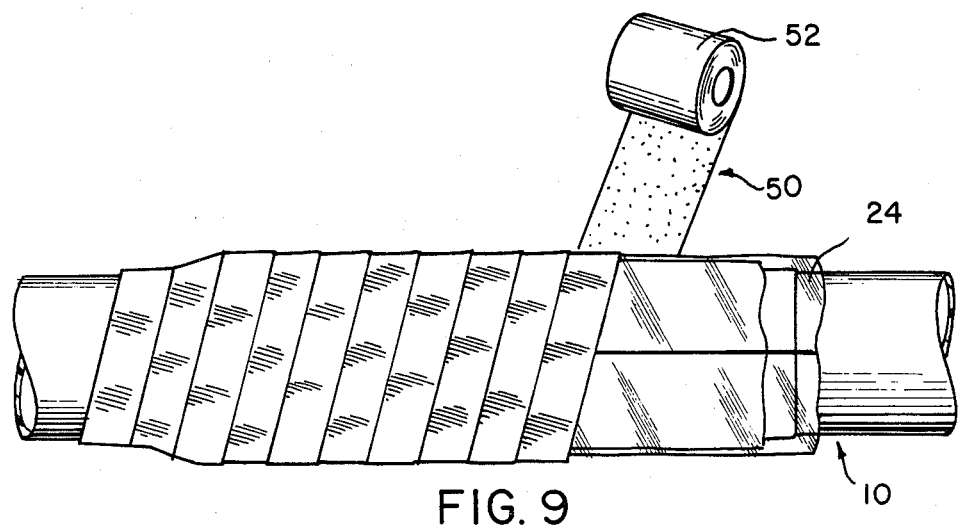

Referring to FIG. 1, there is shown an extent of electrical cable 10 which includes a plurality of conductors 12 extending therethrough. Conductors 12 are of conventional construction, each having an outer insulative covering thereover. A portion of the cable 10 is typically broken away to create an exposed area 14 for maintenance, repair or splice purposes which are performed in a manner well known in the art. Such splices or connections are shown schematically at 15. Also shown is the ground connection 17 at either side of the spliced aea. Hereinthroughout, the terms "exposed area" and "cable splice" will be used interchangeably to describe the area of the cable which is to be resealed. It is not uncommon for the length of the exposed area 14 to be between 6 inches and 60 inches. A method of resealing the exposed area in accordance with the present invention is now described with reference to FIGS. 2–11.

In preferred form and as shown in FIG. 2, the conductors 12 spanning the exposed area 14, may be covered with a covering layer or web 16 which may be formed of resin inpregnated, non-woven nylon or other suitable material. The web 16 functions as an additional layer of protection which buffers the conductors from direct burial hazards. The wrapped web 16 is secured to the cable 10 by a layer of sealant material 19 placed at each end thereof.

Referring now to FIGS. 3 and 4, the exposed area 14 is surrounded by an extent of film 18. Film 18 is an adhesively coated length of flexible polyethylene having its adhesive side 18a covered by a release layer 20 (FIG. 3). Polyethylene is chosen as a preferred material as it is both flexible and transparent and can be readily manipulated by the installer. However, any similar suitable material may also be employed.

The film extent 18 is cut from a roll of such film (not shown) to have a length which is slightly greater than both the length of the exposed area 14 and the web 16. Usually the film extent 18 is cut about eight inches longer than the exposed area 14, to provide a four inch overlap onto the cable insulation on both sides of the exposed area, as will be described hereinbelow. As the film extent 18 is supplied from a roll, it can be cut to accommodate any size exposed area. Further, when used on cable of greater diameter, two nearly identical lengths of film 18 can be cut and positioned side-to-side in an overlapping fashion to accommodate the greater diameter cable.

As shown in FIG. 4, film extent 18 is folded approximately in half along the length of the cable 10 to enclose the exposed area 14. The adhesive surface 18a of film extent 18 is placed facing the cable 10. Film extent 18 thus forms a pouch or trough 22 about the exposed area 14. As the adhesive surface 18a faces cable 10, it will adhere thereto. The folded portions of film extent 18 will extend past the sealant material 19 securing web 16, and will adhere to both the sealant material 19 and adjacent extents 24 of cable 10. An adhesive seal will be formed between the trough 22 and the covered cable extents 24. In addition, the upwardly extending portions of the film surfaces 18a will adhere to the opposite folded side. The two folded sides above the cable 10 are joined to each other at film end portions 26 and above longitudinal edges 27 above cable extents 24. A central portion of the folded film 18 is kept open between side portions 26, which forms an access opening 30 to the exposed area 14. Access opening 30 is in communication with the exposed area 14 to provide for receipt of the encapsulant therearound as will be described in detail hereinafter. Thus, as shown in FIG. 4, an elongate sealed enclosure is formed, defining a trough 22 extending around and partially encloses the exposed area 14 of cable 10.

Referring now to FIG. 5, an inlet member 32 is shown interposed in accessing opening 30. Inlet member 32 is a flexible, generally tubular member having an oval shaped open lower portion 34 and a sealable upper portion 35. In the present embodiment, inlet member 32 is formed of either one or two webs of polyethylene material which can be folded or sealed along its longitudinal sides 36. The upper portion 35 includes a slide fastening closure member 38 which, in the present embodiment, is a manually sealable zipper-type closure known in the art under the trademark "MINI-GRIP" and manufactured by Minigrip, Inc., Orangeburg, N.Y. The closure can be manually opened and closed from the outside, but is constructed not to open under internal pressure of the contents, once closed.

Inlet member 32 is inserted into opening 30 and is adhered to the opposite adhesive sides 18a of the trough 22 formed by the folded film extent 18. Inlet member 33 is fully accommodated in opening 30 and extends downward toward the exposed area 14 of cable 10. The length of the inlet member 32 may vary. It should be long enough to sufficiently adhere to the trough 22, and may extend down to and in contact with the exposed area 14.

In practice, a simple and convenient method of suitably attaching the inlet member 32 to the trough 22 is to adhere the inlet member 32 along the edge of unfolded film extent 18, then fold the film around the cable 10 and engage the non-adhered side of inlet member 32 with the opposite folded edge of film extent 18. If the inlet member does not extend entirely down to the exposed area 14, the folded sides of the film extent 18 below inlet member 32 may adhere together. Access to the exposed area can again be cleared by reaching into the inlet member 32 and manually parting the adhered sections above the exposed area 14.

Having provided an access region to the exposed cable, the encapsulant 40 may be poured into the trough 22 as shown in FIG. 5. Encapsulant 40 is typically a polyurethane compound which is provided in a semi-fluid state so that it may be poured into trough 22 and surround exposed area 14. The encapsulant 40 will typically cure, in approximately 60 minutes to a gel-like consistency to prevent water penetration through the cable and into the exposed portion. The cured encapsulant 40 also protects the conductors 12 from physical abuse as a result of direct burial.

After having poured the encapsulant 40 into trough 22, any excess air is squeezed out and the inlet member 32 is manually closed, using the zipper-type closure 38. The encapsulant will be contained at the bottom of trough 22 surrounding the exposed area 14 of cable 10 as shown in FIG. 7.

Referring now to FIG. 8, the outwardly extending edge of the closed inlet member 32 and the extending side portion 26 of trough 22 (FIG. 4) are folded curvedly down around cable 10 to form a filled tight package around the exposed area 14. As both the film extent 18 and the inlet member 32 are formed of polyethylene or other suitably thin, flexible material, the extending edges can be easily wrapped around the cable 10 and will not unnecessarily add bulk to the enclosed cable splice.

Figure 10:
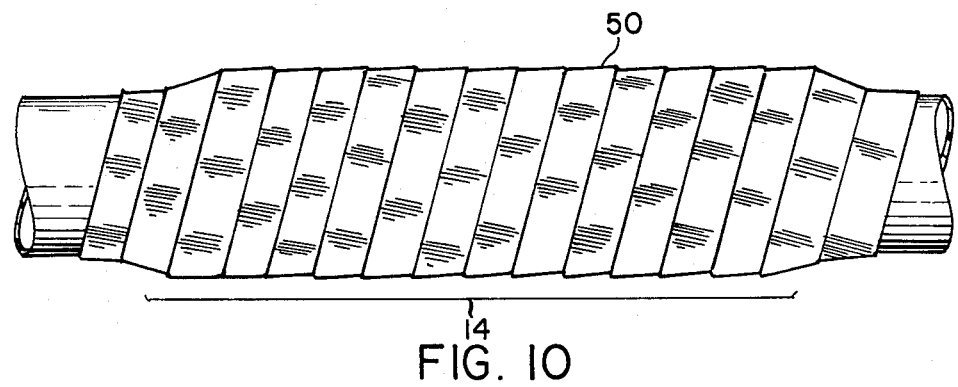

Having prepared the exposed area 14 as above described, the assembly may now be covered with a sealing tape 50, as shown in FIG. 9. Tape 50 is a sealing-type double rubber tape having one cured side and one uncured side which is applied to the enclosed splice in conventional overlapping fashion. Tape 50 is provided in roll 52 and is, for example, of the type commonly known as DR tape. The entire splice area as well as side portions 24 of cable 10 are sealed with the tape 50 as shown in FIG. 10. The taped area may also extend further longitudinally beyond the splice area to assure adequate coverage.

Figure 11:
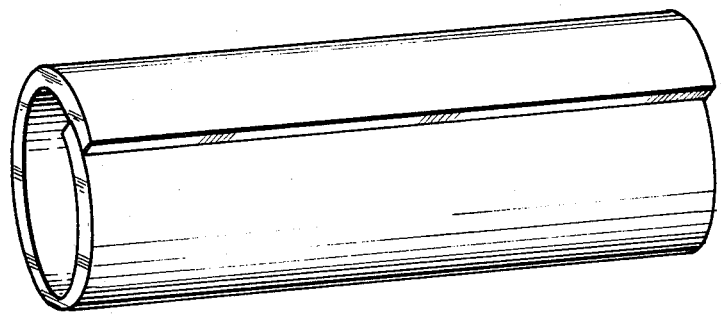
FIG. 11 shows, in a perspective view, a splice closure sleeve which is employed in the preferred arrangement in covering the sealed splice shown in FIG. 10.

After sealing with the tape 50, the splice is further covered with sheath repair sleeve 60 such as shown in FIG. 11. Repair sleeve 60 is of the type known in the art which is used to enclose cable splices. Sleeve 60 provides additional environmental and mechanical protection to the splice area. One such sleeve is described in commonly assigned U.S. Pat. No. 4,358,634 issued Nov. 9, 1982 and entitled Protective Cover for Use in Sealed Cable Splices.

The cable 10 may now be reinserted in the ground. The splice area being sealed to prevent moisture penetration and mechanically protected to prevent damage from backfill.

Various other modifications to the foregoing disclosed embodiment will be evident to those skilled in the art. Thus, the particularly described preferred embodiment is intended to be illustrative and not limited thereto. The true scope of the invention is set forth in the following claims.

What is claimed is:

1. A method of sealing an exposed area of an electrical cable comprising the steps of:
   forming an enclosure around said exposed area;
   sealably attaching said enclosure to said cable adjacent said exposed area;
   providing an access opening in said enclosure;
   interposing selectively closable flexible inlet means into said access opening;

filling said enclosure through said inlet means with an encapsulant, said encapsulant substantially surrounding said exposed area;

closing said inlet means, thereby preventing escape of said encapsulant;

sealably wrapping said filled enclosure and said closed flexible inlet means with sealing tape; and placing a sealing sleeve around said wrapped enclosure.

2. The method in accordance with claim 1 wherein said forming step further comprises:

forming said enclosure into an elongate trough having an open upper end.

3. The method in accordance with claim 2 wherein said sealing step comprises:

sealing the opposite elongate ends of said trough to said cable at either side of said exposed area.

4. The method in accordance with claim 3 wherein said providing step comprises:

partially closing said open upper end of said trough and thereby providing said access opening along an extent thereof.

5. The method in accordance with claim 1 wherein said closing step comprises:

manually closing said sealing member of said inlet means.

6. The method in accordance with claim 1 further comprising, prior to the forming step, the step of:

wrapping said exposed area with a protective covering.

7. The method in accordance with claim 1 further including the step of:

sealably securing said inlet means to said enclosure adjacent said access opening.

8. A method of sealably covering an exposed portion of an electrical cable comprising:

enclosing said exposed portion with an elongate self-adhering enclosure sheet;

providing an access opening in said enclosure sheet;

inserting a sealable flexible inlet member in said opening;

adhering a portion of said inlet member to said enclosure sheet;

pouring an encapsulant into and through said inlet member to surround said exposed portion;

sealing said inlet member; and wrapping said enclosure sheet and said flexible inlet member with sealing tape.

9. The method in accordance with claim 8 wherein said enclosing step includes:

folding said enclosure sheet around said exposed portion;

sealably adhering at least one longitudinal end of said enclosure sheet to said cable adjacent to the exposed portion.

10. The method in accordance with claim 9 wherein the folding step further comprises:

sealably adhering the other longitudinal end of said enclosure sheet to said cable; and wherein said providing step further comprises providing said access opening longitudinally between the two said sealably adhered longitudinal ends.

11. The method in accordance with claim 8 further comprising the step of:

wrapping said exposed portion with a protective layer.

12. In a method of sealing an exposed area of an electrical cable including the steps of providing an enclosure around said exposed area, filling said enclosure with an encapsulant, and sealably covering said enclosure, the improvement comprising the steps of:

interposing a selectively openable inlet member in said enclosure for passage of said encapsulant;

closing said inlet member upon receipt of said encapsulant;

folding said inlet member in said enclosure upon sealably covering said enclosure; and sealably adhering said inlet member to said enclosure.

13. The method in accordance with claim 12 wherein said closing step further comprises:

manually closing said inlet member.

* * * * *